(No Model.)
J. V. STRIBLING.
VEHICLE WHEEL.
No. 384,650. Patented June 19, 1888.
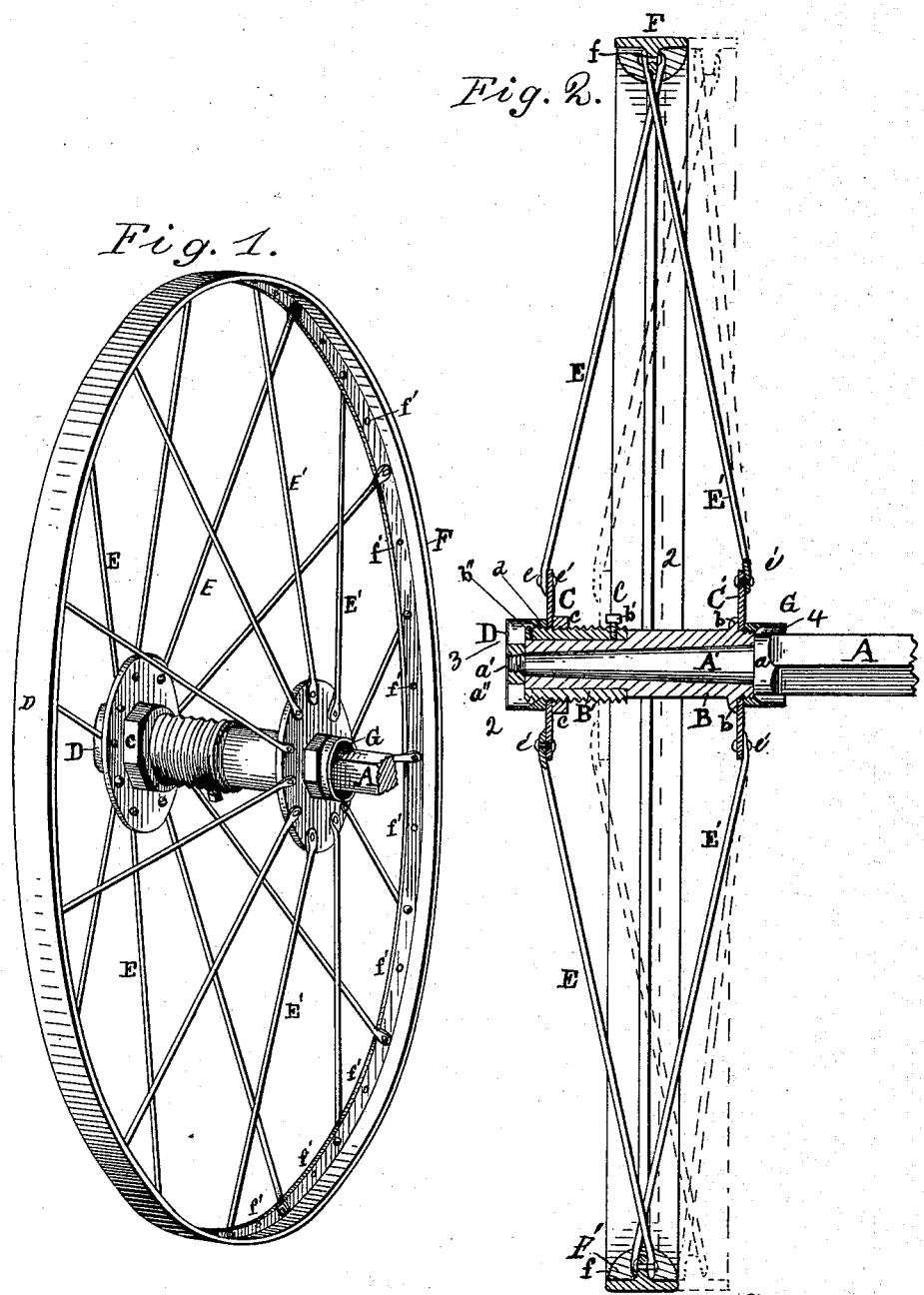
Witnesses,
Thos. Houghton.
Thos. H. Young.
Inventor,
John V. Stribling.
By his Attorney,
Wm. R. Singleton.

UNITED STATES PATENT OFFICE.

JOHN VERNER STRIBLING, OF WESTMINSTER, SOUTH CAROLINA.

VEHICLE-WHEEL.

SPECIFICATION forming part of Letters Patent No. 384,650, dated June 19, 1888.

Application filed September 15, 1887. Serial No. 249,742. (No model.)

*To all whom it may concern:*

Be it known that I, JOHN VERNER STRIBLING, a citizen of the United States, residing at Westminster, in the county of Oconee and State of South Carolina, have invented new and useful Improvements in Metal Wheels for Vehicles and other Purposes, of which the following is a specification, reference being had to the accompanying drawings.

This invention relates to certain improvements in suspension metal wheels for vehicles and other purposes, which will be hereinafter more fully described, and pointed out in the claim.

In the accompanying drawings, forming part of this specification, Figure 1 is a perspective view of a suspension-wheel with my improvements attached. Fig. 2 is a transverse section of Fig. 1.

A is the axle or shaft on which the wheel is to revolve.

A' is the spindle.

a is the shoulder; a', the screw-thread at the end of the spindle, and a'' the nut fitted to it.

B is a sleeve or hub fitted to the spindle A', having the second sleeve, B', fitted to the reduced part at the outer end thereof. The sleeve B' has its exterior surface screw-threaded.

C C' are disks having in each as many holes as there are suspension-rods. These disks have holes in the middle, which are threaded to fit the threads on the sleeves B B'. The hub or sleeve B has a projecting shoulder, b, against which the disk C' bears.

D is a point-band fitted to screw onto the sleeve B'. In it is a hole, d, which corresponds with a hole, b'', in the sleeve B', for a purpose which will be hereinafter described. The sleeve B' can be secured in any position by the set-screw b'.

E E' are the suspension-rods, which are to be riveted to the disks C C' at one end and to the mid-rib f of tire F, as shown in the drawings.

F' represents the fellies of wood, which are secured to the tire F by means of wood-screws through the rib in holes f', as seen in Fig. 1.

G is the sand-band, which is screwed onto the sleeve or hub B and against the disk C' to secure it against the shoulder b of the hub.

The suspension-rods E E' are riveted at one end through holes in the disks C C' and at the other end on the opposite side of the mid-rib f of the tire F, thus giving the rods a larger angle. It is also contemplated as a modification to carry the rods through the holes in the disks and rib, and to bend the rods into a hook form, and thus dispense with the rivets altogether. As the sand and mud would be thrown up by the tread of the tire, wooden fellies F' are inserted each side of the mid-rib f and fastened by wood-screws through holes f' in the mid-rib at such distance apart as will secure the fellies.

A jam-nut, c, is placed on the sleeve B' inside of the disk C, for the purpose of securing the disk in its proper position when the rods shall have been strained.

The spindle A' is secured by the nut a'' inside of the point-band D.

To construct a wheel according to my invention, after all the several parts have been formed the suspension-rods are all placed and riveted to the disks C and C' and to the rib f of the tire F, the two disks being situated near each other, as seen in dotted lines in Fig. 2. The hub or sleeve B is screwed into the opening in disk C' until the shoulder b is hard up against it. The sand-band G is then screwed on. The sleeve B is slipped over the reduced end of sleeve B'. The point-band D is then screwed onto sleeve B' until the hole b'' corresponds with the hole d in the band. A pin is then inserted in the holes to keep the band D and sleeve B' in position. The sleeve B' is screwed into the threaded orifice in disk C by means of band D, so as to bring that disk from the position in dotted lines to that shown in solid lines, thus spreading the two disks, and thereby tightening the rods E E'. When the wheel is sufficiently tightened, the set-screw b' is then screwed down to secure the sleeve B' upon the hub B. The nut c is then screwed up closely to the disk C and acts as a jam-nut. The loose pin is then removed from the holes b'' d, and the point-band is screwed up hard against the disk C, as shown in Fig. 2. The wheel is finally placed upon the spindle and secured by means of the nut $a''$.

I claim—

The combination of the hub or sleeve B, having a shoulder, $b$, the sleeve B′, threaded on the exterior and temporarily secured to the point-band D by a pin, the set-screw $b'$, the sand-band G, the disks C C′, the suspension-rods E E′, secured to the disks, and the ribbed tire F.

In testimony that I claim the foregoing as my own I hereto affix my signature in presence of two witnesses.

JOHN VERNER STRIBLING.

Witnesses:
R. E. MASON,
JOHN C. BARTON.